J. H. DICKBRADER.
OILING OR LUBRICATING AXLE OR SPINDLE.
APPLICATION FILED APR. 15, 1915.

1,209,684.

Patented Dec. 26, 1916.

Inventor:
John Harry Dickbrader

UNITED STATES PATENT OFFICE.

JOHN HARRY DICKBRADER, OF WASHINGTON, MISSOURI.

OILING OR LUBRICATING AXLE OR SPINDLE.

1,209,684.   Specification of Letters Patent.   Patented Dec. 26, 1916.

Application filed April 15, 1915. Serial No. 21,584.

*To all whom it may concern:*

Be it known that I, JOHN HARRY DICKBRADER, a citizen of the United States, residing at Washington, county of Franklin, and State of Missouri, have invented new and useful Improvements in Oiling or Lubricating Axles or Spindles.

The present invention relates to improvements in axle lubricators, and is designed primarily to equip a wheel hub with a lubricating device for the spindle in order to obviate the necessity of removing the wheel from its axle or spindle when replenishing the oil supply.

The invention consists in certain novel combinations and arrangements of parts as hereinafter more specifically set forth and claimed.

In the accompanying drawings I have illustrated one complete example of the physical embodiment of my invention constructed according to the best mode I have so far devised for the practical application of the principles of my invention.

Figure 1:
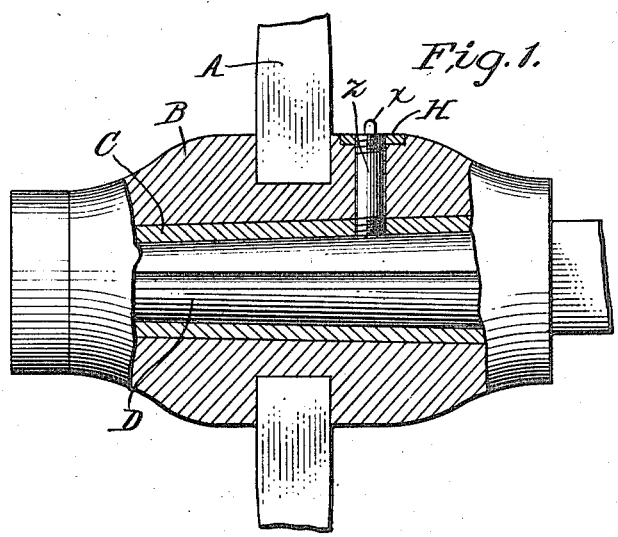
Figure 2:
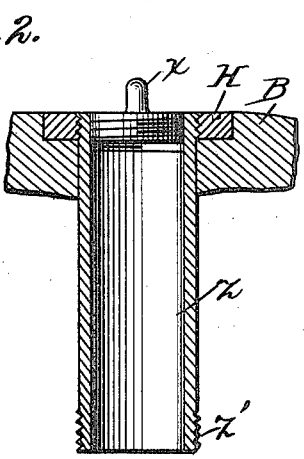

Figure 1 is a sectional view of a wheel hub showing my improved lubricator installed therein. Fig. 2 is a detached, enlarged sectional view of the lubricating device.

In the preferred embodiment of my invention as shown in the drawings I have illustrated a portion of a wheel including the spokes A, the wheel hub B, the hub boxing or housing C, and the axle of spindle D of usual standard type.

The hub is bored radially with relation to its longitudinal axis to receive a metallic tube Z which is threaded at Z' and screwed into the threaded opening in the housing C as shown in Fig. 1. This inner end of the tube is open so that the oil or other lubricant may flow freely therethrough to the interior of the housing of the spindle and lubricate the spindle as usual. The other or outer end of the tube is also externally threaded to receive a lock nut H screwed thereon for the purpose of securely locking the tube in place in the hub, and to facilitate the application of the tube to the hub, as well as add to the appearance of the hub when the oiler is installed therein.

The open outer end of the tube is closed by the utilization of a screw plug $x$, threaded into the end of the tube as shown in Fig. 2, to prevent leakage or waste of oil from the tube.

Buggies, wagons, truck and farm machinery wheels, or axles, may be easily and quickly oiled through the utilization of this appliance.

When the axle or spindle D is larger on one end than the other, or tapered, the tube Z should preferably be placed nearer to the larger end, thus permitting the oil to lubricate the axle in less time than would be required if the oiler were located nearer the smaller end. The tube is of course filled through its outer open or unplugged end, and when once the tube is filled and the plug screwed home there is no possibility of wasting or leakage of the oil, except by way of the spindle.

What I claim is:—

The combination with a radially perforated wheel hub and a spindle housing having a threaded alined opening, of a tube in the perforated hub having external threads at both ends and screwed into the housing, internal threads at the outer end of the tube and a plug screwed therein, and a lock nut engaging the outer external threaded end of the tube and in contact with the wheel hub.

In testimony whereof I have signed my name to this specification.

JOHN HARRY DICKBRADER.